3,071,581
CYCLOPENTANOPHENANTHRENE COMPOUNDS
AND PROCESS
John A. Zderic, Palo Alto, Calif., and Otto Halpern and Jose Iriarte, Mexico City, Mexico, assignors, by mesne assignments, to Syntex Corporation, a corporation of Panama
No Drawing. Filed Jan. 5, 1962, Ser. No. 164,626
Claims priority, application Mexico June 12, 1961
20 Claims. (Cl. 260—239.55)

The present invention relates to novel cyclopentanophenanthrene derivatives and to a novel process for the production thereof.

More particularly the present invention relates to novel 3-halo and 3-desoxy $\Delta^5$-pregnene derivatives.

The novel compounds of the present invention which are progestational agents with anti-estrogenic, anti-gonadotrophic and anti-ovulatory properties are represented by the following formula:

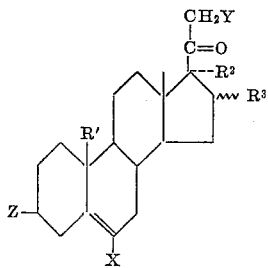

In the above formula Y may be hydrogen or fluorine; X represents hydrogen, fluorine, chlorine or methyl; Z represents hydrogen, fluorine, chlorine, or bromine; $R^1$ may represent hydrogen or methyl; $R^2$ may be hydroxyl or a hydrocarbon carboxylic acyloxy group of less than 12 carbon atoms; $R^3$ represents hydrogen, $\alpha$-methyl, $\beta$-methyl, $\alpha$-hydroxy or $\alpha$-acyloxy; in addition $R^2$ and $R^3$ together may represent the group

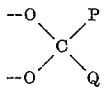

wherein P may be lower alkyl and Q represents a lower alkyl or an aryl or aralkyl group, each containing up to 8 carbon atoms.

The acyl groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and $\beta$-chloropropionate.

The novel 3-halo-6-unsubstituted compounds of the present invention are prepared by the process exemplified by the following equation:

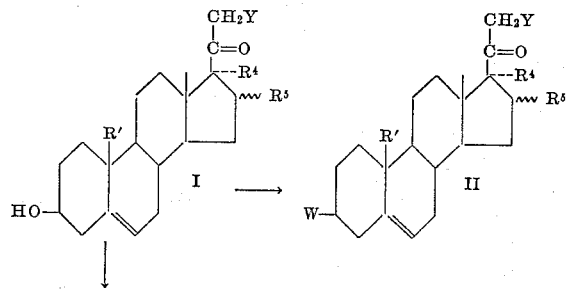

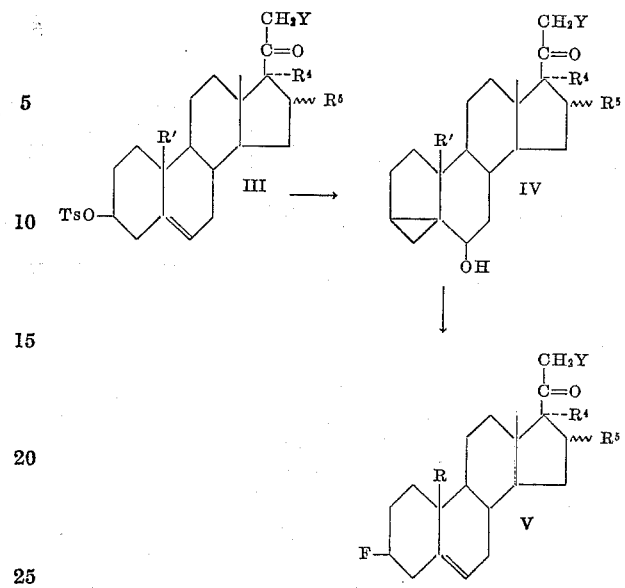

In the above formulas, $R^1$ and Y have the same meaning as previously described; $R^4$ may be a hydrocarbon carboxylic acyloxy group of less than 12 carbon atoms; $R^5$ represents hydrogen, $\alpha$-methyl, $\beta$-methyl or $\alpha$-acyloxy; in addition $R^4$ and $R^5$ together may represent the group

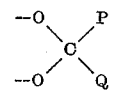

wherein P and Q have the same meaning as previously set forth; W represents chlorine or bromine.

In practicing the process outlined above, the starting compound which is a pregnenolone derivative (I) is treated with phosphorus pentachloride or pentabromide in a solvent inert to the reagent, such as benzene, to form the corresponding 3$\beta$-chloro or 3$\beta$-bromo derivative (II).

Following a second sequence of reactions, the starting compound is treated with a lower hydrocarbon sulfonic acid chloride, preferably p-toluenesulfonic acid chloride in pyridine solution, thus forming the corresponding 3$\beta$-tosylate (III) which upon treatment with a weak base, such as potassium acetate yields the respective 3,5-cyclo-6$\beta$-hydroxy derivative (IV). The latter compound is treated with hydrogen fluoride, in a solvent inert to the reagents, preferably tetrahydrofuran, to produce the corresponding 3$\beta$-fluoro-$\Delta^5$-pregnene derivative (V).

The 3-desoxy-6-unsubstituted compounds of the present invention are prepared by the process illustrated as follows:

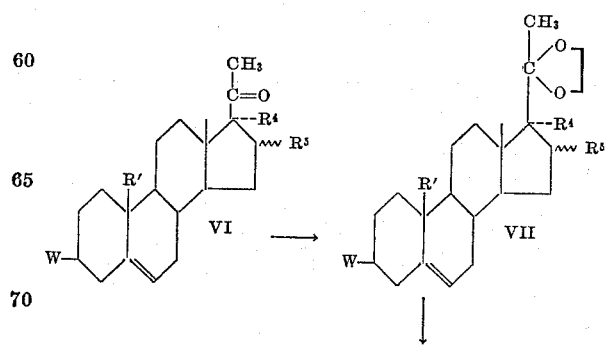

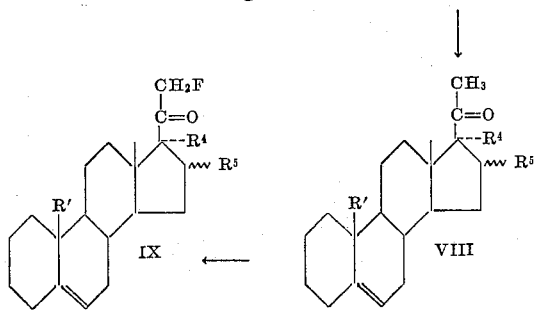

In the above formulas, W, $R^1$, $R^4$ and $R^5$ have the same meaning as heretofore defined.

In practicing the process just outlined, the starting compound which is a 3-halo-$\Delta^5$-pregnene derivative, preferably a 3$\beta$-chloro or 3$\beta$-bromo compound (VI), is treated with ethylene glycol in the presence of p-toluenesulfonic acid, thus furnishing the corresponding 20-cycloethylenedioxy derivative (VII) which upon reduction with an alkali metal such as sodium in liquid ammonia followed by acid hydrolysis of the 3-deshalo compound thus formed yields the corresponding 2-unsubstituted-$\Delta^5$-pregnen-20-one derivative (VIII). Reaction of this compound with iodine, in the presence of calcium oxide and in a suitable solvent such as tetrahydrofuran-methanol, yields the corresponding 21-iodo compound which upon treatment with a metal fluoride, preferably silver fluoride gives the respective 3-unsubstituted-21-fluoro-$\Delta^5$-pregnen-20-one derivative (IX).

The 6-fluoro or 6-chloro compounds of the present invention are prepared by the process exemplified by the following equation:

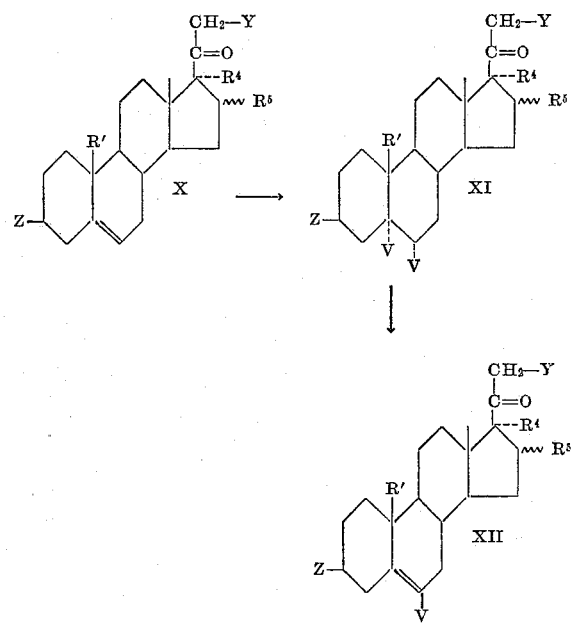

In the above formulas, Z, Y, $R^1$, $R^4$ and $R^5$ have the same meaning as heretofore set forth; V represents fluorine or chlorine.

In practicing the process outlined above, the starting compound, which is a $\Delta^5$-pregnene derivative (X) is treated with iodobenzene dichloride or difluoride to give the corresponding 5$\alpha$,6$\alpha$-dichloro or difluoro derivative (XI). This derivative, upon treatment in a basic medium such as calcium carbonate in dimethylformamide is dehydrohalogenated to the corresponding 6-fluoro or chloro $\Delta^5$-pregnene compound (XII).

The 6-methyl compounds of the present invention may be prepared by the process illustrated by the following equation:

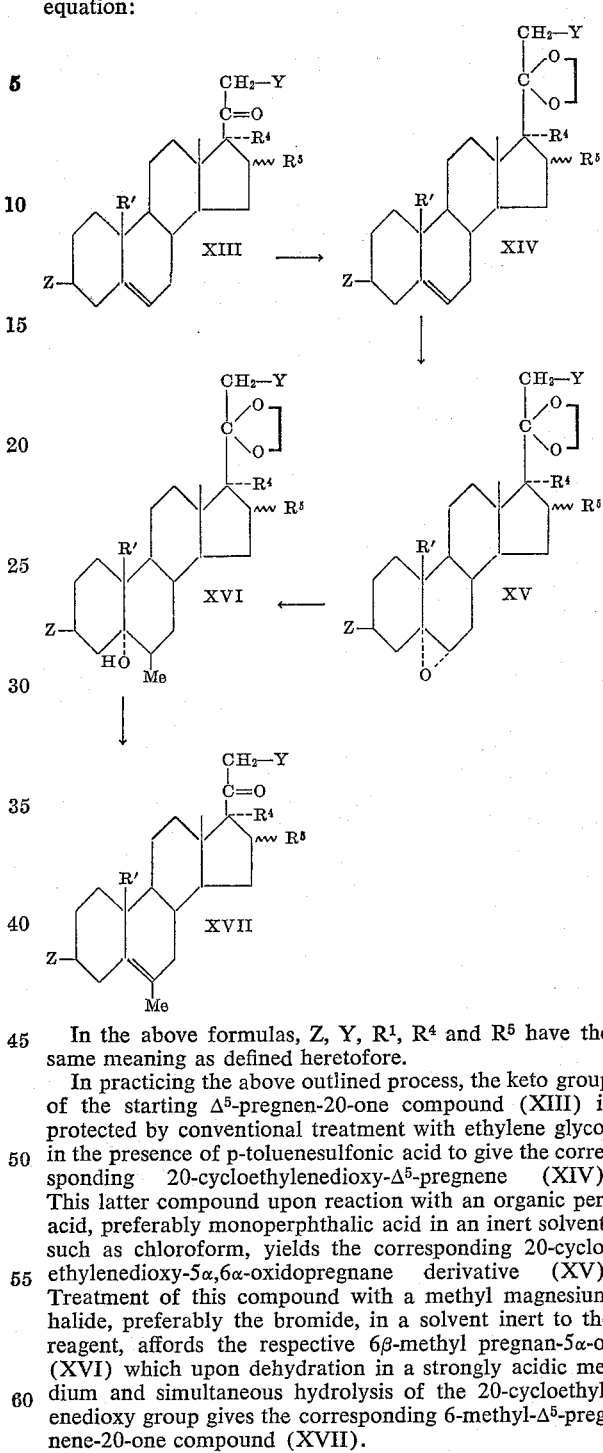

In the above formulas, Z, Y, $R^1$, $R^4$ and $R^5$ have the same meaning as defined heretofore.

In practicing the above outlined process, the keto group of the starting $\Delta^5$-pregnen-20-one compound (XIII) is protected by conventional treatment with ethylene glycol in the presence of p-toluenesulfonic acid to give the corresponding 20-cycloethylenedioxy-$\Delta^5$-pregnene (XIV). This latter compound upon reaction with an organic peracid, preferably monoperphthalic acid in an inert solvent, such as chloroform, yields the corresponding 20-cycloethylenedioxy-5$\alpha$,6$\alpha$-oxidopregnane derivative (XV). Treatment of this compound with a methyl magnesium halide, preferably the bromide, in a solvent inert to the reagent, affords the respective 6$\beta$-methyl pregnan-5$\alpha$-ol (XVI) which upon dehydration in a strongly acidic medium and simultaneous hydrolysis of the 20-cycloethylenedioxy group gives the corresponding 6-methyl-$\Delta^5$-pregnene-20-one compound (XVII).

The compounds obtained by the above described procedures, which have a 17$\alpha$-acyloxy group present in the molecule, yield the corresponding 17$\alpha$-hydroxyl derivative by conventional saponification, preferably with an alkali metal hydroxide.

The final compounds of the present invention having a ketonide at the 16,17-positions produce the 16$\alpha$,17$\alpha$-diols by hydrolysis with a strong acid, preferably formic acid.

The free alcohols thus obtained, are conventionally acylated with an excess of an acylating agent, as for example an anhydride derived from a hydrocarbon carboxylic acid of the type described hereinbefore, in the presence of p-toluenesulfonic acid, thus affording correspondingly the 17α-monoacylates or the 16α,17α-diacylates. The latter compounds, upon selective saponification in a mild alkaline medium, yield the corresponding 16α-hydroxy-17α-acyloxy derivative which by further acylation gives the respective 16,17-diesters with the same or different ester groups. Alternatively, conventional acylation of the 16α,17α-diol in the absence of p-toluenesulfonic acid yields the corresponding 16α-acyloxy-17α-hydroxy compound which upon further acylation in the presence of p-toluenesulfonic acid with the same or a different acylating agent gives the corresponding 16,17-diester with the same or different ester groups.

The following specific examples serve to illustrate but are not intended to limit the scope of the present invention:

PREPARATION 1

A mixture of 6.6 g. of the known 16α-methyl-Δ⁵-pregnen-3β-ol-20-one, 2.7 g. of p-toluenesulfonic acid and 300 cc. of acetic anhydride was submitted to a slow distillation during 5 hours. The residue was cooled and poured into ice water. The product was then extracted with ether, the extract washed successively with an aqueous solution of sodium carbonate and water to neutral, dried and evaporated to dryness. The residue consisted of 3β,20-diacetoxy - 16α - methyl - Δ⁵,¹⁷⁽²⁰⁾ - pregnadiene which was utilized in the following step without purification.

6 g. of this crude steroid were treated with 480 cc. of a 1.2 molar solution of perbenzoic acid in benzene (2.2 molar equivalents), at room temperature and in the dark, for 20 hours. Water was then added, the organic layer separated, washed with an aqueous solution of sodium bicarbonate, then with water, dried with anhydrous sodium sulfate and evaporated to dryness. The residue consisted of the crude 3β,20β-diacetoxy-16α-methyl-5α,6α;17α,20α-bis-oxido-pregnane.

This crude oxido compound was treated with 500 cc. of a 1% methanolic solution of potassium hydroxide at room temperature for 1 hour, the mixture was neutralized by addition of acetic acid, concentrated to small volume under reduced pressure and the product was precipitated by addition of ice water, filtered off, washed with water, dried and recrystallized from acetone-methanol, thus yielding 16α-methyl-5α,6α-oxido-pregnane-3β,17α-diol-20-one.

To 5 g. of the latter oxido compound in 80 cc. of glacial acetic acid, there was added a mixture of 6 g. of sodium iodide, 1.6 g. of sodium acetate, 320 mg. of zinc and 2 drops of water. While cooling in an ice bath and stirring, there were added to the resulting mixture 800 mg. of zinc dust in small portions. The stirring was continued for 6 hours and the temperature allowed to attain 25° C.

The reaction mixture was filtered and the filtrate diluted with ice water, alkalized with sodium bicarbonate and extracted with ethyl acetate. The extract was washed to neutral, dried over anhydrous sodium sulfate and evaporated to dryness. Crystallization from acetone-hexane gave 16α-methyl-Δ⁵-pregnene-3β,17α-diol-20-one.

A mixture of 4 g. of the foregoing steroid, 4 g. of p-toluenesulfonic acid monohydrate, 250 cc. of acetic acid and 100 cc. of acetic anhydride was kept for 24 hours at room temperature. It was then poured into water and stirred until the excess of anhydride had hydrolyzed. Isolation of the product by methylene chloride extraction and crystallization of the residue from acetone-ether gave 16α-methyl-Δ⁵-pregnene-3β,17α-diol-20-one-diacetate.

A suspension of 4 g. of the above steroid in 260 cc. of methanol was treated with a solution of 4 g. of potassium carbonate in 26 cc. of water; the mixture was boiled under reflux for 30 minutes and then cooled in ice and diluted with water. The formed precipitate was collected and recrystallized from acetone-hexane to yield 16α-methyl-Δ⁵-pregnene-3β,17α-diol-20-one-17-acetate.

Following the same reaction sequence, 16β-methyl-Δ⁵-pregnen-3β-ol-20-one (16β-methyl pregnenolone) was converted into 16β-methyl-Δ⁵-pregnene-3β,17α-diol-20-one-17-acetate.

PREPARATION 2

A solution of 5 g. of sodium borohydride in 13 cc. of water was added to an ice-cooled solution of 5 g. of 19-nor-progesterone in 500 cc. of methanol and the mixture was allowed to stand for 16 hours at room temperature. The excess reagent was decomposed by addition of acetic acid, the solution concentrated to small volume in vacuo and diluted with water. The product was extracted with ethyl acetate, the extract was washed with water, dried and evaporated. The solid residue was purified by crystallization from acetone-hexane to give 19-nor-Δ⁴-pregnene-3β,20β-diol and 19-nor-Δ⁴-pregnene-3α,20β-diol.

A mixture of 4.5 g. of the latter mixture of compounds in 100 cc. of dioxane, and 1.1 molar equivalents of 2,3-dichloro-5,6-dicyano-1,4-benzoquinone was kept at room temperature for 3 hours. The hydroquinone formed during the reaction was filtered off, and the filtrate evaporated to dryness. The residue was dissolved in acetone and filtered through 100 g. of alumina. Crystallization from acetone-hexane gave 19-nor-Δ⁴-pregnen-20β-ol-3-one.

A solution of 4 g. of the foregoing steroid in 50 cc. of acetic anhydride and 50 cc. of acetyl chloride was boiled for 4 hours under an atmosphere of nitrogen. The reaction mixture was then distilled almost to dryness, cooled, diluted with ether and the organic extract washed with water, then with 5% sodium bicarbonate solution and finally with water. There was thus obtained 3,20β-diacetoxy-19-nor-Δ³,⁵-pregnadiene.

A solution of 3 g. of sodium borohydride in 9 cc. of water was added to an ice-cooled solution of 3 g. of the above compound in 360 cc. of methanol and the mixture was allowed to stand for 16 hours at room temperature. The excess reagent was decomposed by addition of acetic acid, the solution concentrated to small volume in vacuo and diluted with water. The product was extracted with ethyl acetate, the extract was washed with water, dried and evaporated. The solid residue was purified by crystallization from acetone-hexane to give 19-nor-Δ⁵-pregnene-3β,20β-diol-20-acetate.

5 cc. of dihydropyrane were added to a solution of 2 g. of the foregoing compound in 40 cc. of benzene and about 2 cc. was distilled to remove moisture. 1 g. of p-toluenesulfonic acid was added to the cooled solution, which was then allowed to stand at room temperature for 4 days. The solution was washed with sodium carbonate and water, dried and evaporated. The residue was chromatographed on 45 g. of neutral alumina. Crystallization of the fractions eluted with hexane from pentane yielded the 3-tetrahydropyranyl ether-19-nor-Δ⁵-pregnene-3β,20β-diol-20-acetate.

A suspension of 2.5 g. of the above ether in 160 cc. of methanol was treated with a solution of 2 g. of potassium carbonate in 16 cc. of water; the mixture was boiled under reflux for 1 hour and then cooled in ice and diluted with water. The formed precipitate was collected and recrystallized from acetone-hexane to yield the 3-tetrahydropyranyl ether of 19-nor-Δ⁵-pregnene-3β,20β-diol.

A solution of 2 g. of the foregoing compound in 40 cc. of pyridine was added to a mixture of 2 g. of chromic trioxide in 40 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded the 3-tetrahydropyranyl ether of 19-nor-Δ⁵-pregnen-3β-ol-20-one.

To a solution of 1 g. of the foregoing tetrahydropyranyl ether in 30 cc. of acetic acid was added 0.5 cc. of 2 N hydrochloric acid. After 5 hours at room temperature, water was added and the product extracted with methylene chloride. The extract was washed to neutral, dried over anhydrous sodium sulfate and evaporated to dryness.

Crystallization from acetone-hexane yielded 19-nor-Δ⁵-pregnen-3β-ol-20-one.

PREPARATION 3

A mixture of 1 g. Δ⁵-pregnene-3β,16α,17α-triol-20-one, 50 cc. of freshly distilled acetophenone and 0.5 cc. of 72% perchloric acid was stirred at room temperature for 1 hour. The resulting mixture was washed with sodium bicarbonate solution and with water to neutrality, then it was steam distilled and the product extracted with methylene chloride. The extract was dried over anhydrous sodium sulfate and evaporated to dryness. Crystallization from acetone-hexane yielded the 16,17-acetophenonide of Δ⁵-pregnene-3β,16a,17a-triol-20-one.

Example I

To a solution of 5 g. of the 17-acetate of Δ⁵-pregnene-3β,17β-diol-20-one in 100 cc. of anhydrous benzene, there were added 5 g. of phosphorus pentachloride and the resulting mixture was refluxed for 1 hour in the absence of moisture. Water was added and the benzene layer was separated, washed several times with water, dried over anhydrous sodium sulfate and evaporated to dryness. Crystallization of the residue from acetone-hexane yielded the acetate of 3β-chloro-Δ⁵-pregnen-17α-ol-20-one; M.P. 216–218° C., [α]$_D$ −59° (CHCl₃).

When applying the above technique to the starting compounds under I, there were obtained the corresponding products under II:

| I | II |
|---|---|
| 17α-acetoxy-16α-methyl-Δ⁵-pregnen-3β-ol-20-one | 3β-chloro-17α-acetoxy-16α-methyl-Δ⁵-pregnen-20-one |
| 17α-acetoxy-16β-methyl-Δ⁵-pregnen-3β-ol-20-one | 3β-chloro-17α-acetoxy-16β-methyl-Δ⁵-pregnen-20-one |
| 16α-methyl-Δ⁵-pregnen-3β-ol-20-one | 3β-chloro-16α-methyl-Δ⁵-pregnen-20-one |
| 16β-methyl-Δ⁵-pregnen-3β-ol-20-one | 3β-chloro-16β-methyl-Δ⁵-pregnen-20-one |
| 19-nor-Δ⁵-pregnen-3β-ol-20-one | 3β-chloro-19-nor-Δ⁵-pregnen-20-one |
| Δ⁵-pregnene-3β,16α,17α-triol-20-one-16,17-acetonide | 3β-chloro-Δ⁵-pregnene-16α,17α-diol-20-one-16,17-acetonide |
| Δ⁵-pregnene-3β,16α,17α-triol-20-one-16,17-acetophenonide | 3β-chloro-Δ⁵-pregnene-16α,17α-diol-20-one-16,17-acetophenonide |
| 21-fluoro-Δ⁵-pregnen-3β-ol-20-one | 3β-chloro-21-fluoro-Δ⁵-pregnen-20-one |
| 21-fluoro-16α-methyl-Δ⁵-pregnen-3β-ol-20-one | 3β-chloro-21-fluoro-16α-methyl-Δ⁵-pregnen-20-one |

Example II

A solution of 5 g. of the 17-acetate of Δ⁵-pregnene-3β,17α-diol-20-one in 100 cc. of anhydrous benzene was treated with 5 g. of phosphorous pentabromide and the mixture was refluxed for 1 hour under anhydrous conditions. After diluting with water the benzene layer was separated and washed several times with water, dried over anhydrous sodium sulfate and evaporated to dryness under vacuum. By crystallization from acetone-hexane, there was obtained the acetate of 3β-bromo-Δ⁵-pregnen-17α-ol-20-one.

When applying the same technique to the starting compounds under I, there were obtained the corresponding products under II:

| I | II |
|---|---|
| 17α-acetoxy-16α-methyl-Δ⁵-pregnen-3β-ol-20-one. | 3β-bromo-17α-acetoxy-16α-methyl-Δ⁵-pregnen-20-one. |
| 17α-acetoxy-16β-methyl-Δ⁵-pregnen-3β-ol-20-one. | 3β-bromo-17α-acetoxy-16β-methyl-Δ⁵-pregnen-20-one. |
| 16α-methyl-Δ⁵-pregnen-3β-ol-20-one. | 3β-bromo-16α-methyl-Δ⁵-pregnen-20-one. |
| 16β-methyl-Δ⁵-pregnen-3β-ol-20-one. | 3β-bromo-16β-methyl-Δ⁵-pregnen-20-one. |
| 19-nor-Δ⁵-pregnen-3β-ol-20-one. | 3β-bromo-19-nor-Δ⁵-pregnen-20-one. |
| Δ⁵-pregnene-3β,16α,17α-triol-20-one-16,17-acetonide. | 3β-bromo-Δ⁵-pregnene-16α,17α-diol-20-one-16,17-acetonide. |
| Δ⁵-pregnene-3β,16α,17α-triol-20-one-16,17-acetophenonide. | 3β-bromo-Δ⁵-pregnene-16α,17α-diol-20-one-16,17-acetophenonide. |
| 21-fluoro-Δ⁵-pregnen-3β-ol-20-one. | 3β-bromo-21-fluoro-Δ⁵-pregnen-20-one. |
| 21-fluoro-16α-methyl-Δ⁵-pregnen-3β-ol-20-one. | 3β-bromo-21-fluoro-16α-methyl-Δ⁵-pregnen-20-one. |

Example III

To a solution of 5 g. of the 17-acetate of Δ⁵-pregnene-3β,17α-diol-20-one in 20 cc. of pyridine was added 2.5 g. of tosyl chloride and the mixture was kept overnight at room temperature; after pouring into water the precipitate formd was collected by filtration, thus furnishing the 17-acetate-3-tosylate of Δ⁵-pregnene-3β,17α-diol-20-one.

A mixture of 3 g. of the above compound, 4 g. of sodium acetate, 90 cc. of acetone and 70 cc. of water was refluxed for 6 hours. At the end of this time it was diluted with water, extracted with ethyl acetate and the organic layer was washed with water, dried and evaporated to dryness under vacuum. The residue was crystallized from methylene-chloride-methanol, thus furnishing the 17-acetate of 3,5-cyclopregnane-6β,17α-diol-20-one with M.P. 201–203° C.

A solution of 2 g. of the above compound in 15 cc. of benzene was treated with 25 cc. of 40% hydrofluoric acid and the mixture was kept standing for 24 hours at room temperature. It was then cautiously poured into ice water, neutralized with sodium carbonate, extracted with ethyl acetate and the organic extract was washed to neutral, dried and evaporated to dryness. By chromatography of the residue on 100 g. of washed alumina, there was obtained the 17-acetate of 3β-fluoro-Δ⁵-pregnen-17α-ol-20-one; M.P. 197–199° C., [α]$_D$ −79° (CHCl₃).

Example IV

A solution of 5 g. of 21-fluoro-16α-methyl-Δ⁵-pregnen-3β-ol-20-one in 25 cc. of pyridine was cooled to 0° C. Under stirring, there was added 1.3 g. of tosyl chloride, the mixture was kept for 16 hours at 0° C., diluted with 100 cc. of chloroform, washed with dilute hydrochloric acid, water, aqueous sodium bicarbonate solution and again with water, dried over anhydrous sodium sulfate and then evaporated to dryness under reduced pressure. Thus there was obtained the crude 3-tosylate of the starting compound.

A mixture of 4 g. of the foregoing tosylate, 6 g. of potassium acetate, 120 cc. of acetone and 100 cc. of water was refluxed for 6 hours. Then it was diluted with water for 6 hours. Then it was diluted with water and extracted with ethyl acetate. The organic extract was washed with water, dried over anhydrous sodium sulfate and evaporated dryness. The residue was recrystallized from methylene chloride-methanol to give 21-fluoro-16α-methyl-3,5-cyclopregnan-6β-ol-20-one.

In a polyethylene flask, adapted with magnetic stirrer, there was dissolved 2.8 g. of the foregoing steroid in 30 cc. of methylene chloride, the solution was cooled to 0° C. and a solution of 1.2 g. of anhydrous hydrogen fluoride in 20 cc. of tetrahydrofuran cooled in a Dry-Ice acetone bath (−70° C.) was added over a period of 20 minutes with constant stirring. The mixture was stirred at a temperature lower than 10° C. for 6 additional hours, then neutralized by cautiously adding a 5% aqueous sodium bicarbonate solution and transferred to a separatory funnel. The organic layer was washed with water, dried over anhydrous sodium sulfate and concentrated until formation of an abundant precipitate. The mixture was cooled, the precipitate filtered and redissolved in hot ethyl acetate, the insoluble material was filtered off and the filtrate cooled whereby 3β,21-difluoro-16α-methyl-Δ⁵-pregnen-20-one crystallized.

Following exactly the same procedures, the starting compounds under I were consecutively converted into the corresponding 3-tosylates, 3,5-cyclo-6β-ols and finally into the products under II:

| I | II |
|---|---|
| 17α-acetoxy-16α-methyl-Δ⁵-pregnen-3β-ol-20-one. | 3β-fluoro-17α-acetoxy-16α-methyl-Δ⁵-pregnen-20-one. |
| 17α-acetoxy-16β-methyl-Δ⁵-pregnen-3β-ol-20-one. | 3β-fluoro-17α-acetoxy-16β-methyl-Δ⁵-pregnen-20-one. |
| 16α-methyl-Δ⁵-pregnen-3β-ol-20-one. | 3β-fluoro-16α-methyl-Δ⁵-pregnen-20-one. |
| 16β-methyl-Δ⁵-pregnen-3β-ol-20-one. | 3β-fluoro-16β-methyl-Δ⁵-pregnen-20-one. |
| 19-nor-Δ⁵-pregnen-3β-ol-20-one. | 3β-fluoro-19-nor-Δ⁵-pregnen-20-one. |
| Δ⁵-pregnene-3β,16α,17α-triol-20-one-16,17-acetonide. | 3β-fluoro-Δ⁵-pregnen-16α,17α-diol-20-one-16,17-acetonide. |
| Δ⁵-pregnene-3β,16α,17α-triol-20-one-16,17-acetophenonide. | 3β-fluoro-Δ⁵-pregnene-16α,17α-diol-20-one-16,17-acetophenonide. |
| 21-fluoro-Δ⁵-pregnen-3β-ol-20-one. | 3β,21-difluoro-Δ⁵-pregnen-20-one. |

*Example V*

To a mixture of 16.7 g. of anhydrous hydrogen fluoride and 28.1 g. of anhydrous tetrahydrofuran previously cooled to −80° C. in a Dry Ice-acetone bath, there was cautiously added a suspension of 2 g. of the 17-acetate of 3,5-cyclopregnane-6α,17α-diol-20-one in 30 cc. of methylene chloride. The mixture was stirred for 1 hour at −80° C. and then kept at 0° C. for 18 hours more. It was then cautiously poured into ice water and neutralized with 50 g. of sodium carbonate. Methylene chloride was added and the organic layer was separated, washed with water to neutral, dried over anhydrous sodium sulfate and evaporated to dryness under vacuum. The residue was chromatographed on 100 g. of washed alumina. The fractions eluted with hexane-benzene 80/20 were crystallized from methylene chloride-methanol, thus yielding the acetate of 3β-fluoro-Δ⁵-pregnen-17α-ol-20-one, identical with the one obtained in Example III.

*Example VI*

A mixture of 5 g. of 3β-chloro-19-nor-Δ⁵-pregnen-20-one, 150 cc. of anhydrous benzene, 60 cc. of ethyleneglycol distilled over sodium hydroxide and 800 mg. of p-toluenesulfonic acid monohydrate was refluxed for 12 hours with the use of an adapter for the continuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give 20-cycloethylenedioxy-3β-chloro-19-nor-Δ⁵-pregnene.

Following the same procedure, there were treated the starting compounds under I affording correspondingly the products under II:

| I | II |
|---|---|
| 3β-chloro-17α-acetoxy-16α-methyl-Δ⁵-pregnen-20-one. | 20-cycloethylenedioxy-3β-chloro-17α-acetoxy-16α-methyl-Δ⁵-pregnene. |
| 3β-chloro-17α-acetoxy-16β-methyl-Δ⁵-pregnen-20-one. | 20-cycloethylenedioxy-3β-chloro-17α-acetoxy-16β-methyl-Δ⁵-pregnene. |
| 3β-chloro-17α-acetoxy-Δ⁵-pregnen-20-one. | 20-cycloethylenedioxy-3β-chloro-17α-acetoxy-Δ⁵-pregnene. |
| 3β-chloro-16α-methyl-Δ⁵-pregnen-20-one. | 20-cycloethylenedioxy-3β-chloro-16α-methyl-Δ⁵-pregnene. |
| 3β-chloro-16β-methyl-Δ⁵-pregnen-20-one. | 20-cycloethylenedioxy-3β-chloro-16β-methyl-Δ⁵-pregnene. |
| 3β-bromo-Δ⁵-pregnene-16α,17α-diol-20-one-16,17-acetonide. | 20-cycloethylenedioxy-3β-bromo-Δ⁵-pregnene-16α,17α-diol-16,17-acetonide |
| 3β-bromo-Δ⁵-pregnene-16α,17α-diol-20-one-16,17-acetophenonide. | 20-cycloethylenedioxy-3β-bromo-Δ⁵-pregnene-16α,17α-diol-16,17-acetophenonide. |

*Example VII*

A solution of 4 g. of 20-cycloethylenedioxy-3β-chloro-19-nor-Δ⁵-pregnene in 40 cc. of tetrahydrofuran was added in a steady stream to a solution of 1 g. of sodium in 200 cc. of liquid ammonia with good stirring. After 5 minutes, methanol was added dropwise until the blue color was discharged and the ammonia was then allowed to evaporate. The resulting mixture was evaporated to dryness and the residue taken up in acetone. The formed solution was acidified with concentrated hydrochloric acid and left overnight at room temperature. It was then poured into water, extracted with methylene chloride and the organic extract washed with water to neutral, dried over anhydrous sodium sulfate and evaporated to dryness. Crystallization from acetone-hexane gave 19-nor-Δ⁵-pregnen-20-one.

When applying the above procedure to the starting compounds under I, there were obtained the corresponding products listed under II:

| I | II |
|---|---|
| 20-cycloethylenedioxy-3β-chloro-17α-acetoxy-16α-methyl-Δ⁵-pregnene. | 17α-acetoxy-16α-methyl-Δ⁵-pregnen-20-one. |
| 20-cycloethylenedioxy-3β-chloro-17α-acetoxy-16β-methyl-Δ⁵-pregnene. | 17α-acetoxy-16β-methyl-Δ⁵-pregnen-20-one. |
| 20-cycloethylenedioxy-3β-chloro-17α-acetoxy-Δ⁵-pregnene. | 17α-acetoxy-Δ⁵-pregnen-20-one. |
| 20-cycloethylenedioxy-3β-chloro-16α-methyl-Δ⁵-pregnene. | 16α-methyl-Δ⁵-pregnen-20-one. |
| 20-cycloethylenedioxy-3β-chloro-16β-methyl-Δ⁵-pregnene. | 16β-methyl-Δ⁵-pregnen-20-one. |
| 20-cycloethylenedioxy-3β-bromo-Δ⁵-pregnene-16α,17α-diol-16,17-acetonide. | Δ⁵-pregnene-16α,17α-diol-20-one-16,17-acetonide. |
| 20-cycloethylenedioxy-3β-bromo-Δ⁵-pregnene-16α,17α-diol-16,17-acetophenonide. | Δ⁵-pregnene-16α,17α-diol-20-one-16,17-acetophenonide. |

*Example VIII*

A cooled solution of 4 g. of 19-nor-Δ⁵-pregnen-20-one in 30 cc. of tetrahydrofuran and 18 cc. of methanol was treated under continuous stirring with 6 g. of pure calcium oxide in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving 21-iodo-19-nor-Δ⁵-pregnen-20-one.

The foregoing compound was dissolved in 20 cc. of acetonitrile and treated dropwise with 1.4 g. of silver fluoride dissolved in 3 cc. of water. After a short time, silver iodide started to separate leaving the 21-fluoropregnane derivative in solution. The mixture was kept for 24 hours at room temperature and filtered. Concentration of the filtrate under vacuum gave a crude product which after crystallization from methanol-acetone yielded 21-fluoro-19-nor-Δ⁵-pregnen-20-one.

The starting compound listed under I, were treated by the above techniques, thus being successively converted into the corresponding 21-iodo derivatives and the final products under II:

| I | II |
|---|---|
| 17α-acetoxy-16α-methyl-Δ⁵-pregnen-20-one. | 21-fluoro-17α-acetoxy,16α-methyl-Δ⁵-pregnen-20-one. |
| 17α-acetoxy-16β-methyl-Δ⁵-pregnen-20-one. | 21-fluoro-17α-acetoxy-16β-methyl-Δ⁵-pregnen-20-one. |
| 17α-acetoxy-Δ⁵-pregnen-20-one. | 21-fluoro-17α-acetoxy-Δ⁵-pregnen-20-one. |
| 16α-methyl-Δ⁵-pregnen-20-one. | 21-fluoro-16α-methyl-Δ⁵-pregnen-20-one. |
| 16β-methyl-Δ⁵-pregnen-20-one. | 21-fluoro-16β-methyl-Δ⁵-pregnen-20-one. |
| Δ⁵-pregnene-16α,17α-diol-20-one-16,17-acetonide. | 21-fluoro-Δ⁵-pregnene-16α,17α-diol-20-one-16,17-acetonide. |
| Δ⁵-pregnene-16α,17α-diol-20-one-16,17-acetophenonide. | 21-fluoro-Δ⁵-pregnene-16α,17α-diol-20-one-16,17-acetophenonide. |

*Example IX*

A mixture of 2.5 g. of 3β-chloro-17α-acetoxy-Δ⁵-pregnen-20-one, 1.05 mol. equivalents of iodobenzene dichloride and 100 cc. of chloroform was refluxed until the crystals of the reagent disappeared. The solvents were removed and the residue recrystallized from chloroform-ethyl acetate, thus yielding 3β,5α,6α-trichloro-17α-acetoxypregnan-20-one.

2 g. of the latter compound in 40 cc. of dimethylformamide was added over 5 minutes to a suspension of 5 g. of finely divided calcium carbonate in 15 cc. of refluxing dimethylformamide. The mixture was refluxed for 5 minutes further, cooled and filtered. The filtrate was diluted with water and extracted with ethyl acetate. The extract was washed with dilute hydrochloric acid, water, aqueous sodium bicarbonate solution and water, then dried over anhydrous sodium sulfate and evaporated to dryness. Silica gel chromatography and recrystallization afforded 3β,6-dichloro-17α-acetoxy-Δ⁵-pregnen-20-one.

When applying the above techniques to the starting compounds listed under I, there were consecutively obtained the coresponding 5α,6α-dichloro derivatives and the products disclosed under II:

| I | II |
|---|---|
| 3β-chloro-17α-acetoxy-16α-methyl-Δ⁵-pregnen-20-one. | 3β,6-dichloro-17α-acetoxy-16α-methyl-Δ⁵-pregeen-20-one. |
| 3β-chloro-17α-acetoxy-16β-methyl-Δ⁵-pregnen-20-one. | 3β,6-dichloro-17α-acetoxy-16β-methyl-Δ⁵-pregnen-20-one. |
| 3β-chloro-16α-methyl-Δ⁵-pregnen-20-one. | 3β,6-dichloro-16α-methyl-Δ⁵-pregnen-20-one. |
| 3-chloro-16β-methyl-Δ⁵-pregnen-20-one. | 3β,6-dichloro-16β-methyl-Δ⁵-pregnen-20-one. |
| 3β-chloro-19-nor-Δ⁵-pregnen-20-one. | 3β,6-dichloro-19-nor-Δ⁵-pregnen-20-one. |
| 3β-chloro-Δ⁵-pregnene-16α,17α-diol-20-one-16,17-acetonide. | 3β,6-dichloro-Δ⁵-pregnene-16α,17α-diol-20-one-16,17-acetonide. |
| 3β-chloro-Δ⁵-pregnene-16α,17α-diol-20-one-16,17-acetophenonide. | 3β,6-dichloro-Δ⁵-pregnene-16α,17α-diol-20-one-16,17-acetophenonide. |
| 3β-chloro-21-fluoro-Δ⁵-pregnen-20-one. | 3β,6-dichloro-21-fluoro-Δ⁵-pregnen-20-one. |
| 3β-chloro-21-fluoro-16α-methyl-Δ⁵-pregnen-20-one. | 3β,6-dichloro-21-fluoro-16α-methyl-Δ⁵-pregnen-20-one. |
| 3β-bromo-17α-acetoxy-16α-methyl-Δ⁵-pregnen-20-one. | 3β-bromo-6-chloro-17α-acetoxy-16α-methyl-Δ⁵-pregnen-20-one. |
| 3β-bromo-17α-acetoxy-16β-methyl-Δ⁵-pregnen-20-one. | 3β-bromo-6-chloro-17α-acetoxy-16β-methyl-Δ⁵-pregnen-20-one. |
| 3β-bromo 16α-methyl-Δ⁵-pregnen-20-one. | 3β-bromo-6-chloro-16α-methyl-Δ⁵-pregnen-20-one. |
| 3β-bromo-16β-methyl-Δ⁵-pregnen-20-one. | 3β-bromo-6-chloro-16β-methyl-Δ⁵-pregnen-20-one. |
| 3β-bromo-19-nor-Δ⁵-pregnen-20-one. | 3β-bromo-6-chloro-19-nor-Δ⁵-pregnen-20-one. |
| 3β-bromo-Δ⁵-pregnene-16α,17α-diol-20-one-16,17-acetonide. | 3β-bromo-6-chloro-Δ⁵-pregnene-16α,17α-diol-20-one-16,17-acetonide. |
| 3β-bromo-Δ⁵-pregnene-16α,17α-diol-20-one-16,17-acetophenonide. | 3β-bromo-6-chloro-Δ⁵-pregnene-16α,17α-diol-20-one-16,17-acetophenonide. |
| 3β-bromo-21-fluoro-Δ⁵-pregnen-20-one. | 3β-bromo-6-chloro-21-fluoro-Δ⁵-pregnen-20-one. |
| 3β-bromo-21-fluoro-16α-methyl-Δ⁵-pregnen-20-one. | 3β-bromo-6-chloro-21-fluoro-16α-methyl-Δ⁵-pregnen-20-one. |
| 3β-fluoro-17α-acetoxy-16α-methyl-Δ⁵-pregnen-20-one. | 3β-fluoro-6-chloro-17α-acetoxy-16α-methyl-Δ⁵-pregnen-20-one. |
| 3β-fluoro-17α-acetoxy-16β-methyl-Δ⁵-pregnen-20-one. | 3β-fluoro-6-chloro-17α-acetoxy-16β-methyl-Δ⁵-pregnen-20-one. |
| 3β-fluoro-16α-methyl-Δ⁵-pregnen-20-one. | 3β-fluoro-6-chloro-16α-methyl-Δ⁵-pregnen-20-one. |
| 3β-fluoro-16β-methyl-Δ⁵-pregnen-20-one. | 3β-fluoro-6-chloro-16β-methyl-Δ⁵-pregnen-20-one. |
| 3β-fluoro-19-nor-Δ⁵-pregnen-20-one. | 3β-fluoro-6-chloro-19-nor-Δ⁵-pregnen-20-one. |
| 3β-fluoro-Δ⁵-pregnene-16α,17α-diol-20-one-16,17-acetonide. | 3β-fluoro-6-chloro-Δ⁵-pregnene-16α,17α-diol-16,17-acetonide. |
| 3β-fluoro-Δ⁵-pregnene-16α,17α-diol-20-one-16,17-acetophenonide. | 3β-fluoro-6-chloro-Δ⁵-pregnene-16α,17α-diol-20-one-16,17-acetophenonide. |
| 3β,21-difluoro-Δ⁵-pregnen-20-one. | 3β,21-difluoro-6-chloro-Δ⁵-pregnen-20-one. |
| 3β,21-difluoro-16α-methyl-Δ⁵-pregnen-20-one. | 3β,21-difluoro-6-chloro-16α-methyl-Δ⁵-pregnen-20-one. |
| 17α-acetoxy-16α-methyl-Δ⁵-pregnen-20-one. | 6-chloro-17α-acetoxy-16α-methyl-Δ⁵-pregnen-20-one. |
| 17α-acetoxy-16β-methyl-Δ⁵-pregnen-20-one. | 6-chloro-17α-acetoxy-16β-methyl-Δ⁵-pregnen-20-one. |
| 17α-acetoxy-Δ⁵-pregnen-20-one. | 6-chloro-17α-acetoxy-Δ⁵-pregnen-20-one. |
| 19-nor-Δ⁵-pregnen-20-one. | 6-chloro-19-nor-Δ⁵-pregnen-20-one. |
| 16α-methyl-Δ⁵-pregnen-20-one. | 6-chloro-16α-methyl-Δ⁵-pregnen-20-one. |
| 16β-methyl-Δ⁵-pregnen-20-one. | 6-chloro-16β-methyl-Δ⁵-pregnen-20-one. |
| Δ⁵-pregnene-16α,17α-diol-20-one-16,17-acetonide. | 6-chloro-Δ⁵-pregnene-16β,17α-diol-20-one,16,17-acetonide. |
| Δ⁵-pregnene-16α,17α-diol-20-one-16,17-acetophenonide. | 6-chloro-Δ⁵-pregnene-16α,17α-diol-20-one-16,17-acetophenonide. |
| 21-fluoro-17α-acetoxy-16α-methyl-Δ⁵-pregnen-20-one. | 6-chloro-21-fluoro-17α-acetoxy-16α-methyl-Δ⁵-pregnen-20-one. |
| 21-fluoro-17α-acetoxy-16β-methyl-Δ⁵-pregnen-20-one. | 6-chloro-21-fluoro-17α-acetoxy-16β-methyl-Δ⁵-pregnen-20-one. |
| 21-fluoro-17α-acetoxy-Δ⁵-pregnen-20-one. | 6-chloro-21-fluoro-17α-acetoxy-Δ⁵-pregnen-20-one. |
| 21-fluoro-16α-methyl-Δ⁵-pregnen-20-one. | 6-chloro-21-fluoro-16α-methyl-Δ⁵-pregnen-20-one. |
| 21-fluoro-16β-methyl-Δ⁵-pregnen-20-one. | 6-chloro-21-fluoro-16β-methyl-Δ⁵-pregnen-20-one. |
| 21-fluoro-Δ⁵-pregnene-16α,17α-diol-20-one-16,17-acetonide. | 6-chloro-21-fluoro-Δ⁵-pregnene-16α,17α-diol-20-one-16,17-acetonide. |
| 21-fluoro-Δ⁵-pregnene-16α,17α-diol-20-one-16,17-acetophenonide. | 6-chloro-21-fluoro-Δ⁵-pregnene-16α,17α-diol-20-one-16,17-acetophenonide. |
| 3β-bromo-17α-acetoxy-Δ⁵-pregnen-20-one. | 3β-bromo-6-chloro-17α-acetoxy-Δ⁵-pregnen-20-one. |
| 3β-fluoro-17α-acetoxy-Δ⁵-pregnen-20-one. | 3β-fluoro-6-chloro-17α-acetoxy-Δ⁵-pregnen-20-one. |
| 21-fluoro-19-nor-Δ⁵-pregnen-20-one. | 6-chloro-21-fluoro-19-nor-Δ⁵-pregnen-20-one. |

*Example X*

3β-chloro-17α-acetoxy-Δ⁵-pregnen-20-one was treated following the first procedure described in Example IX, with the exception that iodobenzene dichloride was substituted by iodobenzene difluoride, thus yielding 3β-chloro-5α,6α-difluoro-17α-acetoxy-pregnan-20-one which upon treatment by the second procedure of said example furnished 3β-chloro-6-fluoro-17α-acetoxy-Δ⁵-pregnen-20-one.

Following exactly the same methods, the compounds listed under I were first converted into the corresponding 5α,6α-difluoro compounds and therefrom into the respective products under II:

| I | II |
|---|---|
| 3β-chloro-17α-acetoxy-16α-methyl-Δ⁵-pregnen-20-one. | 3β-chloro-6-fluoro-17α-acetoxy-16α-methyl-Δ⁵-pregnen-20-one. |
| 3β-chloro-17α-acetoxy-16β-methyl-Δ⁵-pregnen-20-one. | 3β-chloro-6-fluoro-17α-acetoxy-16β-methyl-Δ⁵-pregnen-20-one. |
| 3β-chloro-16α-methyl-Δ⁵-pregnen-20-one. | 3β-chloro-6-fluoro-16α-methyl-Δ⁵-pregnen-20-one. |
| 3β-chloro-16β-methyl-Δ⁵-pregnen-20-one. | 3β-chloro-6-fluoro-16β-methyl-Δ⁵-pregnen-20-one. |
| 3β-chloro-19-nor-Δ⁵-pregnen-20-one. | 3β-chloro-6-fluoro-19-nor-Δ⁵-pregnen-20-one. |
| 3β-chloro-Δ⁵-pregnene-16α,17α-diol-20-one-16,17-acetonide. | 3β-cholro-6-fluoro-Δ⁵-pregnene-16α,17α-diol-20-one-16,17-acetonide. |
| 3β-chloro-Δ⁵-pregnene-16α,17α-diol-20-one-16,17-acetophenonide. | 3β-chloro-6-flouro-Δ⁵-pregnene-16α,17α-diol-20-one-16,17-acetophenonide. |
| 3β-chloro-21-fluoro-Δ⁵-pregnen-20-one. | 3β-chloro-6,21-difluoro-Δ⁵-pregnen-20-one. |
| 3β-chloro-21-fluoro-16α-methyl-Δ⁵-pregnen-20-one. | 3β-chloro-6,21-difluoro-16α-methyl-Δ⁵-pregnen-20-one. |
| 3β-bromo-17α-acetoxy-16α-methyl-Δ⁵-pregnen-20-one. | 3β-bromo-6-fluoro-17α-acetoxy-16β-methyl-Δ⁵-pregnen-20-one. |
| 3β-bromo-16α-methyl-Δ⁵-pregnen-20-one. | 3β-bromo-6-fluoro-16α-methyl-Δ⁵-pregnen-20-one. |
| 3β-bromo-16β-methyl-Δ⁵-pregnen-20-one. | 3β-bromo-6-fluoro-16β-methyl-Δ⁵-pregnen-20-one. |
| 3β-bromo-19-nor-Δ⁵-pregnen-20-one. | 3β-bromo-6-fluoro-19-nor-Δ⁵-pregnen-20-one. |
| 3β-bromo-Δ⁵-pregnene-16α,17α-diol-20-one-16,17-acetonide. | 3β-bromo-6-fluoro-Δ⁵-pregnene-16α,17α-diol-20-one-16,17-acetonide. |
| 3β-bromo-Δ⁵-pregnene-17,17α-diol-20-one-16,17-acetophenonide. | 3β-bromo-6-fluoro-Δ⁵-pregnene-16α,17α-diol-20-one-16,17-acetophenonide. |
| 3β-bromo-21-fluoro-Δ⁵-pregnen-20-one. | 3β-bromo-6,21-difluoro-Δ⁵-pregnen-20-one. |
| 3β-bromo-21-fluoro-16α-methyl-Δ⁵-pregnen-20-one. | 3β-bromo-6,21-difluoro-16α-methyl-Δ⁵-pregnen-20-one. |
| 3β,6-difluoro-17α-acetoxy-16α-methyl-Δ⁵-pregnen-20-one. | 3β,6-difluoro-17α-acetoxy-16α-methyl-Δ⁵-pregnen-20-one. |
| 3β-fluoro-17α-acetoxy-16β-methyl-Δ⁵-pregnen-20-one. | 3β,6-difluoro-17α-acetoxy-16β-methyl-Δ⁵-pregnen-20-one. |
| 3β-fluoro-16α-methyl-Δ⁵-pregnen-20-one. | 3β,6-difluoro-16α-methyl-Δ⁵-pregnen-20-one. |
| 3β-fluoro-16β-methyl-Δ⁵-pregnen-20-one. | 3β,6-difluoro-16β-methyl-Δ⁵-pregnen-20-one. |
| 3β-fluoro-19-nor-Δ⁵-pregnene-20-one. | 3β,6-difluoro-19-nor-Δ⁵-pregnen-20-one. |
| 3β-fluoro-Δ⁵-pregnene-16α,17α-diol-20-one-16,17-acetonide. | 3β,6-difluoro-Δ⁵-pregnene-16α,17α-diol-20-one-16,17-acetonide. |
| 3β-fluoro-Δ⁵-pregnene-16α,17α-diol-20-one-16,17-acetophenonide. | 3β,6-difluoro-Δ⁵-pregnene-16α,17α-diol-20-one-16,17-acetophenonide. |
| 3β,6,21-difluoro-Δ⁵-pregnen-20-one. | 3β,6,21-trifluoro-Δ⁵-pregnen-20-one. |
| 3β,21-difluoro-16α-methyl-Δ⁵-pregnen-20-one. | 3β,6,21-trifluoro-16α-methyl-Δ⁵-pregnen-20-one. |
| 17α-acetoxy-16α-methyl-Δ⁵-pregnen-20-one. | 6-fluoro-17α-acetoxy-16α-methyl-Δ⁵-pregnen-20-one. |
| 17α-acetoxy-16β-methyl-Δ⁵-pregnen-20-one. | 6-fluoro-17α-acetoxy-16β-methyl-Δ⁵-pregnen-20-one. |
| 17α-acetoxy-Δ⁵-pregnen-20-one. | 6-fluoro-17α-acetoxy-Δ⁵-pregnen-20-one. |
| 16α-methyl-Δ⁵-pregnen-20-one. | 6-fluoro-16α-methyl-Δ⁵-pregnen-20-one. |
| 16β-methyl-Δ⁵-pregnen-20-one. | 6-fluoro-16β-methyl-Δ⁵-pregnen-20-one. |
| Δ⁵-pregnene-16α,17α-diol-20-one-16,17-acetonide. | 6-fluoro-Δ⁵-pregnene-16α,17α-diol-20-one-16,17-acetonide. |
| Δ⁵-pregnene-16α,17α-diol-20-one-16,17-acetophenonide. | 6-fluoro-Δ⁵-pregnene-16α,17α-diol-20-one-16,17-acetophenonide. |
| Δ19-nor-⁵-pregnen-20-one. | 6-fluoro-19-nor-Δ⁵-pregnen-20-one. |
| 21-fluoro-17α-acetoxy-16α-methyl-Δ⁵-pregnen-20-one. | 6,21-difluoro-17α-acetoxy-16α-methyl-Δ⁵-pregnen-20-one. |
| 21-fluoro-17α-acetoxy-16β-methyl-Δ⁵-pregnen-20-one. | 6,21-difluoro-17α-acetoxy-16β-methyl-Δ⁵-pregnen-20-one. |
| 21-fluoro-17α-acetoxy-Δ⁵-pregnen-20-one. | 6,21-difluoro-17α-acetoxy-Δ⁵-pregnen-20-one. |
| 21-fluoro-16α-methyl-Δ⁵-pregnen-20-one. | 6,21-difluoro-16α-methyl-Δ⁵-pregnen-20-one. |
| 21-fluoro-16β-methyl-Δ⁵-pregnen-20-one. | 6,21-difluoro-16β-methyl-Δ⁵-pregnen-20-one. |
| 21-fluoro-Δ⁵-pregnene-16α,17α-diol-20-one-16,17-acetonide. | 6,21-difluoro-Δ⁵-pregnene-16α,17α-diol-20-one-16,17-acetonide. |
| 21-fluoro-Δ⁵-pregnene-16α,17α-diol-20-one-16,17-acetophenonide. | 6,21-difluoro-Δ⁵-pregnene-16α,17α-diol-20-one-16,17-acetophenonide. |
| 3β-bromo-17α-acetoxy-Δ⁵-pregnen-20-one. | 3β-bromo-6-difluoro-17α-acetoxy-Δ⁵-pregnen-20-one. |
| 3β-fluoro-17α-acetoxy-Δ⁵-pregnen-20-one. | 3β,6-difluoro-17α-acetoxy-Δ⁵-pregnen-20-one. |
| 21-fluoro-19-nor-Δ⁵-pregnen-20-one. | 6,21-difluoro-19-nor-Δ⁵-pregnen-20-one. |

Example XI 5 g. of 3β-chloro-21-fluoro-16α-methyl-Δ⁵-pregnen-20-one were treated following the method described in Example VI, thus affording 20-cycloethylenedioxy-3β-chloro-21-fluoro-16α-methyl-Δ⁵-pregnene.

A solution of 4.5 g. of the foregoing steroid in 200 cc. of chloroform was cooled to 0° C. and mixed with 1.1 molar equivalents of monoperphthalic acid in ether solution. The mixture was kept at room temperature for 20 hours, diluted with water, the organic layer was separated, washed with aqueous sodium bicarbonate solution and then with water to neutral, dried over anhydrous sodium sulfate and evaporated to dryness. Crystallization from acetone-hexane gave 20-cycloethylenedioxy-3β-chloro-21-fluoro-16α-methyl-5α,6α-oxido-pregnane.

To a solution of 80 cc. of 4 N methylmagnesium bromide in ether was added, with stirring, a solution of 4 g. of the above oxide in 130 cc. of dry tetrahydrofuran and the stirred mixture heated under reflux for 30 minutes. The condenser was then replaced by a calcium chloride tube, the ether allowed to boil off and when the internal temperature reached 54° C., the condenser was readapted and the mixture refluxed for an additional 4 hours. 800 cc. of a saturated solution of ammonium chloride was added slowly to the cooled mixture which was then stirred for 15 minutes before transfer to a separatory funnel. The tetrahydrofuran layer was separated, dried and evaporated, whereupon crystallization of the residue from aqueous methanol gave 20-cycloethylenedioxy-3β-chloro-21-fluoro-6β,16α-dimethyl-pregnan-5α-ol.

A mixture of 3 g. of the above compound, 400 cc. of acetic anhydride and 1 drop of concentrated sulfuric acid was stirred at room temperature overnight. The resulting solution was then poured into water and the product extracted with methylene chloride. The extract was washed with a 10% aqueous sodium bicarbonate solution, then with water to neutral, dried and evaporated to dryness. Alumina chromatography followed by crystallization of the solid fraction gave 3β-chloro-21-fluoro-6,16α-dimethyl-Δ⁵-pregnan-20-one.

Following the same sequence of reactions, the compounds listed under I were successively converted into the corresponding 20-ketals, therefrom into the respective 5α,6α-oxido-20-cycloethylenedioxy-derivatives, then into the corresponding 5α-hydroxy-6β-methyl-20-cycloethylenedioxy-compounds which upon dehydration and acid hydrolysis afforded the products set forth under II:

| I | II |
|---|---|
| 3β-chloro-17α-acetoxy-16α-methyl-Δ⁵-pregnen-20-one. | 3β-chloro-17α-acetoxy-6,16α-dimethyl-Δ⁵-pregnen-20-one. |
| 3β-chloro-17α-acetoxy-16β-methyl-Δ⁵-pregnen-20-one. | 3β-chloro-17α-acetoxy-6,16β-methyl-Δ⁵-pregnen-20-one. |
| 3β-chloro-17α-acetoxy-Δ⁵-pregnen-20-one. | 3β-chloro-17α-acetoxy-6-methyl-Δ⁵-pregnen-20-one. |
| 3β-chloro-16α-methyl-Δ⁵-pregnen-20-one. | 3β-chloro-6,16α-dimethyl-Δ⁵-pregnen-20-one. |
| 3β-chloro-16β-methyl-Δ⁵-pregnen-20-one. | 3β-chloro-6,16β-dimethyl-Δ⁵-pregnen-20-one. |
| 3β-bromo-19-nor-Δ⁵-pregnen-20-one. | 3β-bromo-6-methyl-19-nor-Δ⁵-pregnen-20-one. |
| 3β-bromo-Δ⁵-pregnene-16α,17α-diol-20-one-16,17-acetonide. | 3β-bromo-6-methyl-Δ⁵-pregnene-16α,17α-diol-20-one-16,17-acetonide. |
| 3β-chloro-Δ⁵-pregnene-16α,17α-diol-20-one-16,17-acetophenonide. | 3β-chloro-6α-methyl-Δ⁵-pregnene-16α,17α-diol-20-one-16,17-acetophenonide. |
| 3β-chloro-21-fluoro-Δ⁵-pregnen-20-one. | 3β-bromo-21-fluoro-6-methyl-Δ⁵-pregnen-20-one. |
| 3β-fluoro-17α-acetoxy-16α-methyl-Δ⁵-pregnen-20-one. | 3β-fluoro-17α-acetoxy-6,16α-dimethyl-Δ⁵-pregnen-20-one. |
| 3β-fluoro-17α-acetoxy-16β-methyl-Δ⁵-pregnen-20-one. | 3β-fluoro-17α-acetoxy-6,16β-dimethyl-Δ⁵-pregnen-20-one. |
| 3β-fluoro-17α-acetoxy-Δ⁵-pregnen-20-one. | 3β-fluoro-17α-acetoxy-6-methyl-Δ⁵-pregnen-20-one. |
| 3β-fluoro-16α-methyl-Δ⁵-pregnen-20-one. | 3β-fluoro-6,16α-dimethyl-Δ⁵-pregnen-20-one. |
| 3β-fluoro-16β-methyl-Δ⁵-pregnen-20-one. | 3β-fluoro-6,16β-dimethyl-Δ⁵-pregnen-20-one. |
| 17α-acetoxy-16α-methyl-Δ⁵-pregnen-20-one. | 17α-acetoxy-6,16α-dimethyl-Δ⁵-pregnen-20-one. |
| 17α-acetoxy-16β-methyl-Δ⁵-pregnen-20-one. | 17α-acetoxy-6,16β-dimethyl-Δ⁵-pregnen-20-one. |
| 17α-acetoxy-Δ⁵-pregnen-20-one. | 17α-acetoxy-6-methyl-Δ⁵-pregnen-20-one. |

| I | II |
|---|---|
| 16α-methyl-Δ⁵-pregnen-20-one. | 6,16α-dimethyl-Δ⁵-pregnen-20-one. |
| 16β-methyl-Δ⁵-pregnen-20-one. | 6,16β-dimethyl-Δ⁵-pregnen-20-one. |
| 21-fluoro-16β-methyl-Δ⁵-pregnen-20-one. | 21-fluoro-6,16β-dimethyl-Δ⁵-pregnen-20-one. |
| 21-fluoro-Δ⁵-pregnene-16α,17α-diol-20-one-16,17-acetonide. | 6-methyl-21-fluoro-Δ⁵-pregnen-16α,17α-diol-20-one-16,17-acetonide. |
| 21-fluoro-Δ⁵-pregnene-16α,17α-diol-20-one-16,17-acetophenonide. | 6-methyl-21-fluoro-Δ⁵-pregnene-16α,21-diol-20-one-16,17-acetophenonide. |

Example XII

A mixture of 2 g. of the acetate of 3β-chloro-Δ⁵-pregnen-17α-ol-20-one and 60 cc. of a 0.5% solution of potassium hydroxide in methanol was refluxed for 2 hours under an atmosphere of nitrogen. After neutralization with acetic acid the mixture was concentrated under vacuum to a small volume, water was added until complete precipitation and the precipitate formed was collected by filtration. Crystallization from methylene chloride-methanol yielded 3β-chloro-Δ⁵-pregnen-17α-ol-20-one; M.P. 197–202° C., $[\alpha]_D$ —67° ($CHCl_3$).

The starting compounds listed below were treated by the same technique, thus furnishing the corresponding products hereinafter disclosed.

| Starting compounds | Products |
|---|---|
| 3β-chloro-17α-acetoxy-16α-methyl-Δ⁵-pregnen-20-one. | 3β-chloro-16α-methyl-Δ⁵-pregnen-17α-ol-20-one. |
| 3β-chloro-17α-acetoxy-16β-methyl-Δ⁵-pregnen-20-one. | 3β-chloro-16β-methyl-Δ⁵-pregnen-17α-ol-20-one. |
| 3β-bromo-17α-acetoxy-16α-methyl-Δ⁵-pregnen-20-one. | 3β-bromo-16α-methyl-Δ⁵-pregnen-17α-ol-20-one. |
| 3β-bromo-17α-acetoxy-16β-methyl-Δ⁵-pregnen-20-one. | 3β-bromo-16β-methyl-Δ⁵-pregnen-17α-ol-20-one. |
| 3β-bromo-17α-acetoxy-Δ⁵-pregnen-20-one. | 3β-bromo-Δ⁵-pregnen-17α-ol-20-one. |
| 3β-fluoro-17α-acetoxy-16α-methyl-Δ⁵-pregnen-20-one. | 3β-fluoro-16α-methyl-Δ⁵-pregnen-17α-ol-20-one. |
| 3β-fluoro-17α-acetoxy-16β-methyl-Δ⁵-pregnen-20-one. | 3β-fluoro-16β-methyl-Δ⁵-pregnen-17α-ol-20-one. |
| 17α-acetoxy-16α-methyl-Δ⁵-pregnen-20-one. | 16α-methyl-Δ⁵-pregnen-17α-ol-20-one. |
| 17α-acetoxy-16β-methyl-Δ⁵-pregnen-20-one. | 16β-methyl-Δ⁵-pregnen-17α-ol-20-one. |
| 17α-acetoxy-Δ⁵-pregnen-20-one. | Δ⁵-pregnen-17α-ol-20-one. |
| 21-fluoro-17α-acetoxy-16α-methyl-Δ⁵-pregnen-20-one. | 21-fluoro-16α-methyl-Δ⁵-pregnen-17α-ol-20-one. |
| 21-fluoro-17α-acetoxy-16β-methyl-Δ⁵-pregnen-20-one. | 21-fluoro-16β-methyl-Δ⁵-pregnen-17α-ol-20-one. |
| 21-fluoro-17α-acetoxy-Δ⁵-pregnen-20-one. | 21-fluoro-Δ⁵-pregnen-17α-ol-20-one. |
| 3β,6-dichloro-17α-acetoxy-16α-methyl-Δ⁵-pregnen-20-one. | 3β,6-dichloro-16α-methyl-Δ⁵-pregnen-17α-ol-20-one. |
| 3β,6-dichloro-17α-acetoxy-16β-methyl-Δ⁵-pregnen-20-one. | 3β,6-dichloro-16β-methyl-Δ⁵-pregnen-17α-ol-20-one. |
| 3β,6-dichloro-17α-acetoxy-Δ⁵-pregnen-20-one. | 3β,6-dichloro-Δ⁵-pregnen-17α-ol-20-one. |
| 3β-bromo-6-chloro-17α-acetoxy-16α-methyl-Δ⁵-pregnen-20-one. | 3β-bromo-6-chloro-16α-methyl-Δ⁵-pregnen-17α-ol-20-one. |
| 3β-bromo-6-chloro-17α-acetoxy-16β-methyl-Δ⁵-pregnen-20-one. | 3β-bromo-6-chloro-16β-methyl-Δ⁵-pregnen-17α-ol-20-one. |
| 3β-bromo-6-chloro-17α-acetoxy-Δ⁵-pregnen-20-one. | 3β-bromo-6-chloro-Δ⁵-pregnen-17α-ol-20-one. |
| 3β-fluoro-6-chloro-17α-acetoxy-16α-methyl-Δ⁵-pregnen-20-one. | 3β-fluoro-6-chloro-16α-methyl-Δ⁵-pregnen-17α-ol-20-one. |
| 3β-fluoro-6-chloro-17α-acetoxy-16β-methyl-Δ⁵-pregnen-20-one. | 3β-fluoro-6-chloro-16β-methyl-Δ⁵-pregnen-17α-ol-20-one. |
| 3β-fluoro-6-chloro-17α-acetoxy-Δ⁵-pregnen-20-one. | 3β-fluoro-6-chloro-Δ⁵-pregnen-17α-ol-20-one. |
| 6-chloro-17α-acetoxy-16α-methyl-Δ⁵-pregnen-20-one. | 6-chloro-16α-methyl-Δ⁵-pregnen-17α-ol-20-one. |
| 6-chloro-17α-acetoxy-16β-methyl-Δ⁵-pregnen-20-one. | 6-chloro-16β-methyl-Δ⁵-pregnen-17α-ol-20-one. |
| 6-chloro-17α-acetoxy-Δ⁵-pregnen-20-one. | 6-chloro-Δ⁵-pregnen-17α-ol-20-one. |
| 3β-chloro-6-fluoro-17α-acetoxy-16α-methyl-Δ⁵-pregnen-20-one. | 3-chloro-6-fluoro-16α-methyl-Δ⁵-pregnen-17α-ol-20-one. |
| 3β-bromo-6-fluoro-17α-acetoxy-16β-methyl-Δ⁵-pregnen-20-one. | 3β-bromo-6-fluoro-16β-methyl-Δ⁵-pregnen-17α-ol-20-one. |
| 3β,6-difluoro-17α-acetoxy-16α-methyl-Δ⁵-pregnen-20-one. | 3β,6-difluoro-16α-methyl-Δ⁵-pregnen-17α-ol-20-one. |
| 3β,6-difluoro-17α-acetoxy-16β-methyl-Δ⁵-pregnen-20-one. | 3β,6-difluoro-16β-methyl-Δ⁵-pregnen-17α-ol-20-one. |
| 3β,6-difluoro-17α-acetoxy-Δ⁵-pregnen-20-one. | 3β,6-difluoro-Δ⁵-pregnen-17α-ol-20-one. |
| 6-fluoro-17α-acetoxy-16α-methyl-Δ⁵-pregnen-20-one. | 6-fluoro-16α-methyl-Δ⁵-pregnen-17α-ol-20-one. |
| 6,21-difluoro-17α-acetoxy-16β-methyl-Δ⁵-pregnen-20-one. | 6,21-difluoro-16β-methyl-Δ⁵-pregnen-17α-ol-20-one. |
| 3β-chloro-17α-acetoxy-6,16α-dimethyl-Δ⁵-pregnen-20-one. | 3β-chloro-6,16α-dimethyl-Δ⁵-pregnen-17α-ol-20-one. |
| 3β-chloro-17α-acetoxy-6,16β-dimethyl-Δ⁵-pregnen-20-one. | 3β-chloro-6,16β-dimethyl-Δ⁵-pregnen-17α-ol-20-one. |

| Starting compounds | Products |
|---|---|
| 3β-fluoro-17α-acetoxy-6,16β-dimethyl-Δ⁵-pregnen-20-one. | 3β-fluoro-6,16β-dimethyl-Δ⁵-pregnen-17α-ol-20-one. |
| 3β-fluoro-17α-acetoxy-6-methyl-Δ⁵-pregnen-20-one. | 3β-fluoro-6-methyl-Δ⁵-pregnen-17α-ol-20-one. |
| 17α-acetoxy-6,16α-dimethyl-Δ⁵-pregnen-20-one. | 6,16α-dimethyl-Δ⁵-pregnen-17α-ol-20-one. |
| 17α-acetoxy-6,16β-dimethyl-Δ⁵-pregnen-20-one. | 6,16β-dimethyl-Δ⁵-pregnen-17α-ol-20-one. |

*Example XIII*

A mixture of 1 g. of 3β-chloro-Δ⁵-pregnen-17α-ol-20-one, 20 cc. of benzene, 2 cc. of caproic anhydride and 0.5 g. of p-toluene sulfonic acid was kept overnight at room temperature; at the end of this time it was diluted with water and stirred for 30 minutes to hydrolyze the excess of anhydride; the benzene layer was separated, washed with 5% sodium carbonate solution and finally with water to neutral, dried over anhydrous sodium sulfate and evaporated to dryness under reduced pressure. Crystallization from acetone-hexane furnished the caproate of 3β-chloro-Δ⁵-pregnen-17α-ol-20-one.

In the same manner, but using undecenoic and propionic anhydrides as esterifying agents, there were obtained the undecenoate and the propionate of 3β-chloro-Δ⁵-pregnen-17α-ol-20-one.

Following the same procedure, there were obtained the caproates, undecenoates, valerates and propionates of the products obtained in the preceding example.

*Example XIV*

1 g. of 3β-chloro-Δ⁵-pregnene-16α,17α-diol-20-one-16,17-acetonide was heated on the steam bath with 100 cc. of 60% formic acid for 30 minutes, diluted with water and neutralized with sodium carbonate. The precipitate that formed was collected by filtration, washed with water, dried and recrystallized from acetone-hexane, thus affording 3β-chloro-Δ⁵-pregnen-16α,17α-diol-20-one.

When applying the same technique to the starting compounds hereinafter set forth, there were obtained the corresponding products listed below:

| Starting compounds | Products |
|---|---|
| 3β-bromo-Δ⁵-pregnene-16α,17α-diol-20-one-16,17-acetophenonide. | 3β-bromo-Δ⁵-pregnene-16α,17α-diol-20-one. |
| 3β-fluoro-Δ⁵-pregnene-16α,17α-diol-20-one-16,17-acetophenonide. | 3β-fluoro-Δ⁵-pregnene-16α,17α-diol-20-one. |
| Δ⁵-pregnene-16α,17α-diol-20-one-16,17-acetonide. | Δ⁵-pregnene-16α,17α-diol-20-one. |
| 21-fluoro-Δ⁵-pregnene-16α,17α-diol-20-one-16,17-acetonide. | 21-fluoro-Δ⁵-pregnene-16α,17α-diol-20-one. |
| 3β,6-dichloro-Δ⁵-pregnene-16α,17α-diol-20-one-16,17-acetonide. | 3β,6-dichloro-Δ⁵-pregnene-16α,17α-diol-20-one. |
| 3β-bromo-6-chloro-Δ⁵-pregnene-16α,17α-diol-20-one-16,17-acetophenonide. | 3β-bromo-6-chloro-Δ⁵-pregnene-16α,17α-diol-20-one. |
| 3β-fluoro-6-chloro-Δ⁵-pregnene-16α,17α-diol-20-one-16,17-acetophenonide. | 3β-fluoro-6-chloro-Δ⁵-pregnene-16α,17α-diol-20-one. |
| 6-chloro-Δ⁵-pregnene-16α,17α-diol-20-one-16,17-acetophenonide. | 6-chloro-Δ⁵-pregnene-16α,17α-diol-20-one. |
| 6-chloro-21-fluoro-Δ⁵-pregnene-16α,17α-diol-20-one-16,17-acetophenonide. | 6-chloro-21-fluoro-Δ⁵-pregnene-16α,17α-diol-20-one. |
| 3β-chloro-6-fluoro-Δ⁵-pregnene-16α,17α-diol-20-one-16,17-acetonide. | 3β-chloro-6-fluoro-Δ⁵-pregnene-16α,17α-diol-20-one. |
| 3β-bromo-6-fluoro-Δ⁵-pregnene-16α,17α-diol-20-one-16,17-acetonide. | 3β-bromo-6-fluoro-Δ⁵-pregnene-16α,17α-diol-20-one. |
| 3β,6-difluoro-Δ⁵-pregnene-16α,17α-diol-20-one-16,17-acetonide. | 3β,6-difluoro-Δ⁵-pregnene-16α,17α-diol-20-one. |
| 6-fluoro-Δ⁵-pregnene-16α,17α-diol-20-one-16,17-acetonide. | 6-fluoro-Δ⁵-pregnene-16α,17α-diol-20-one. |
| 6,21-difluoro-Δ⁵-pregnene-16α,17α-diol-20-one-16,17-acetonide. | 6,21-difluoro-Δ⁵-pregnene-16α,21-diol-20-one. |
| 3β-bromo-6-methyl-Δ⁵-pregnene-16α,17α-diol-20-one-16,17-acetonide. | 3β-bromo-6-methyl-Δ⁵-pregnene-16α,17α-diol-20-one. |
| 3β-chloro-6-methyl-Δ⁵-pregnene-16α,17α-diol-20-one-16,17-acetophenonide. | 3β-chloro-6-methyl-Δ⁵-pregnene-16α,17α-diol-20-one. |
| 6-methyl-21-fluoro-Δ⁵-pregnene-16α,17α-diol-20-one-16,17-acetophenonide. | 6-methyl-21-fluoro-Δ⁵-pregnene-16α,17α-diol-20-one. |

*Example XV*

The products obtained in the foregoing example were treated following the technique described in Example XIII, thus affording the corresponding 16,17-dicaproates thereof.

*Example XVI*

2 g. of 3β-chloro-Δ⁵-pregnene-16α,17α-diol-20-one-16,17-dicaproate were dissolved in 50 cc. of methanol and treated with 5 cc. of a 4% aqueous solution of potassium hydroxide; the reaction mixture was stirred for 1 hour under an atmosphere of nitrogen at 0° C. and the mixture was neutralized with acetic acid and the methanol distilled under reduced pressure. The residue was triturated with water and the solid collected, washed with water, dried and recrystallized from ethyl acetate-methanol, thus producing 3β-chloro-Δ⁵-androstene-16α,17α-diol-20-one-17-caproate.

*Example XVII*

A mixture of 1 g. of the foregoing steroid, 4 cc. of pyridine and 2 cc. of acetic anhydride was kept at room temperature overnight, poured into ice water, the formed precipitate was filtered, washed with water and dried. Crystallization from acetone-hexane gave 3β-chloro-Δ⁵-pregnene-16α,17α-diol-16-acetate-17-caproate.

*Example XVIII*

A solution of 500 mg. of 3β-chloro-Δ⁵-pregnene-16α,17α-diol-20-one in 2 cc. of pyridine and 1 cc. of acetic anhydride was kept overnight at room temperature, then diluted with water until complete precipitation of the product, which was collected by filtration. There was thus obtained the 16-acetate of 3β-chloro-Δ⁵-pregnene-16α,17α-diol-20-one.

By the same method of esterification, but using caproic, valeric and cyclopentylpropionic anhydrides, there were obtained the caproate, valerate and cyclopentylpropionate of 3β-chloro-Δ⁵-pregnene-16α,17α-diol-20-one.

*Example XIX*

A mixture of 5 g. of the acetate of 3β-fluoro-Δ⁵-pregnen-17α-ol-20-one and 150 cc. of 0.5% methanolic potassium hydroxide solution was refluxed for 2 hours under an atmosphere of nitrogen. It was then neutralized with acetic acid, concentrated to a small volume under reduced pressure and poured into water. The precipitate formed was collected by filtration and crystallized from acetone-hexane, thus affording 3β-fluoro-Δ⁵-pregnen-17α-ol-20-one.

500 mg. of the above compound was esterified with propionic anhydride in benzene solution and in the presence of paratoluenesulfonic acid, by following the method described in Example XIII to form the propionate of 3β-fluoro-Δ⁵-pregnen-17α-ol-20-one.

In the same manner, but using valeric and caproic anhydrides as esterifying agents, there were obtained the valerate and the caproate of 3β-fluoro-Δ⁵-pregnen-17α-ol-20-one.

*Example XX*

By following the method of saponification described in Example XII, 1 g. of the acetate of 3β-bromo-Δ⁵-pregnen-17α-ol-20-one was treated with 0.5% methanolic potassium hydroxide solution to produce 3β-bromo-Δ⁵-pregnen-17α-ol-20-one which was then re-esterified with propionic anhydride in the presence of paratoluenesulfonic acid. There was thus obtained the propionate of 3β-bromo-Δ⁵-pregnen-17α-ol-20-one.

*Example XXI*

A mixture of 1 g. of Δ⁵-pregnene-3β,16α,17α-triol-20-one, 50 cc. of recently distilled benzaldehyde and 0.5 cc. of 72% perchloric acid was stirred at room temperature for 1 hour. The resulting solution was washed with sodium bicarbonate solution and with water to neutral, dried over anhydrous sodium sulfate and evaporated to dryness under vacuum. Crystallization of the residue from acetone-methanol furnished the 16α,17α-benzylacetal of Δ⁵-pregnene-3β,16α,17α-triol-20-one.

A solution of 750 mg. of the above compound in 50 cc. of benzene was refluxed for 1 hour with 1 g. of phosphorous pentachloride, in accordance with the method described in Example I. There was thus obtained the 16α,17α-benzyl-acetal of 3β-chloro-Δ⁵-pregnene-16α,17α-diol-20-one.

*Example XXII*

A mixture of 500 mg. of 3β-chloro-Δ⁵-pregnene-16α, 17α-diol-20-one, 10 cc. of benzene, 2 cc. of propionic anhydride and 250 mg. of p-toluenesulfonic acid was kept at room temperature for 24 hours. It was then diluted with water, the benzene layer was separated and washed with 5% sodium carbonate solution and with water to neutral, dried over anhydrous sodium sulfate and evaporated to dryness under reduced pressure. By crystallization of the residue from acetone-hexane, there was obtained the 16,17-dipropionate of 3β-chloro-Δ⁵-pregnene-16α,17α-diol-20-one.

In a similar manner, by treatment of 3β-fluoro-Δ⁵-pregnene-16α,17α-diol-20-one with acetic anhydride in the presence of p-toluenesulfonic acid, there was obtained the 16,17-diacetate of 3β-fluoro-Δ⁵-pregnene-16α,17α-diol-20-one.

*Example XXIII*

A culture of Streptomyces roseochromogenus ATCC 3347 was prepared in an inclined agar medium containing 1% of glucose and 1% of yeast extract. 1 cc. of a suspension of this culture was then used to inoculate each one of a series of 250 cc. flasks containing 50 cc. of a sterilized aqueous medium of 2% peptone and 5% corn syrup, the mixtures were then incubated in a shaking machine at 28° C. under aeration for a period of 24–48 hours. There was thus obtained a vegetating growing culture of Streptomyces roseochromogenus which was used for the subsequent incubation of the steroid.

10 mg. of 3β-chloro-19-nor-Δ⁵-pregnen-20-one, were added to each 50 cc. of the vegetating culture of Streptomyces roseochromogenus, obtained as described above. The mixture was stirred for 48–72 hours with aeration and then extracted several times with methylene dichloride. The extract was washed with water, dried over anhydrous sodium sulfate, filtered and evaporated under reduced pressure.

The residue was purified by chromatography on silica gel thus giving 3β-chloro-19-nor-Δ⁵-pregnen-16α-ol-20-one.

By the same procedure were treated 3β-bromo-19-nor-Δ⁵-pregnen-20-one, 3β-fluoro-19-nor-Δ⁵-pregnen-20-one and 19-nor-Δ⁵-pregnen-20-one, giving respectively 3β-bromo-19-nor-Δ⁵-pregnen-16α-ol-20-one, 3β-fluoro-19-nor-Δ⁵-pregnen-16α-ol-20-one and 19-nor-Δ⁵-pregnen-16α-ol-20-one.

*Example XXIV*

1.5 g. of 3β-chloro-19-nor-Δ⁵-pregnen-16α-ol-20-one were refluxed with a solution of 2 g. of potassium acetate in 100 cc. of acetic acid for 5 hours. The resulting mixture was poured into water, the formed precipitate was collected by filtration, dried and recrystallized from acetone-hexane to give 3β-chloro-19-nor-Δ⁵,¹⁶-pregnadien-20-one.

To a mixture of 1 g. of the latter compound 1 g. of cuprous chloride and 30 cc. of anhydrous tetrahydrofuran was added, while stirring and cooling, 30 cc. of tetrahydrofuran, containing 3 mol. equiv. of methyl magnesium bromide.

The mixture was stirred for 2 hours at 28° C., then poured into ice-water, containing dilute hydrochloric acid. The product was extracted with methylene chloride, the extract washed to neutral with water and dried over anhydrous sodium sulfate. Evaporation of the solvent at reduced pressure gave a residue, which was purified by crystallization from methylene chloride-hexane to afford 3β-chloro-16α-methyl-19-nor-Δ⁵-pregnen-20-one.

Following the same procedures, 3β-bromo-19-nor-Δ⁵-pregnen-16α-ol-20-one, 3β-fluoro-19-nor-Δ⁵-pregnen-16α-ol-20-one and 19-nor-Δ⁵-pregnen-16α-ol-20-one were respectively converted into 3β-bromo-16α-methyl-19-nor-Δ⁵-pregnen-20-one, 3β-fluoro-16α-methyl-19-nor-Δ⁵-pregnen-20-one and 16α-methyl-19-nor-Δ⁵-pregnen-20-one.

We claim:
1. A compound of the following formula:

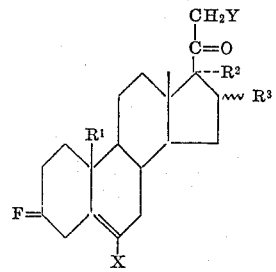

wherein Y is selected from the group consisting of hydrogen and fluorine, X is a member of the group consisting of hydrogen, fluorine, chlorine and methyl; R¹ is a member of the group consisting of hydrogen and methyl, R² is selected from the group consisting of hydroxyl and a hydrocarbon carboxylic acyloxy group of less than 12 carbon atoms; R³ is a member of the group consisting of hydrogen, α-methyl, β-methyl, α-hydroxyl and an α-acyloxy group derived from a hydrocarbon carboxylic acid of less than 12 carbon atoms; R² and R³ together are in addition the group

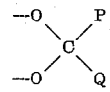

wherein P is a lower alkyl and Q is selected from the group consisting of a lower alkyl, an aryl and an aralkyl group, each containing up to 8 carbon atoms.

2. A compound of the following formula:

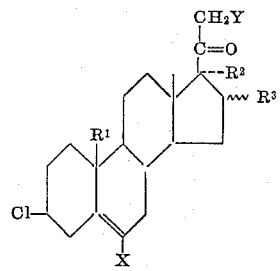

wherein Y is selected from the group consisting of hydrogen and fluorine, X is a member of the group consisting of hydrogen, fluorine, chlorine and methyl, R¹ is a member of the group consisting of hydrogen and methyl, R² is selected from the group consisting of hydroxyl and a hydrocarbon carboxylic acyloxy group of less than 12 carbon atoms; R³ is a member of the group consisting of hydrogen, α-methyl, β-methyl, α-hydroxyl and an α-acyloxy group derived from a hydrocarbon carboxylic acid of less than 12 carbon atoms; R² and R³ together are in addition, the group

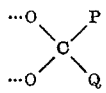

wherein P is a lower alkyl and Q is selected from the group consisting of a lower alkyl, an aryl and an aralkyl group, each containing up to 8 carbon atoms.

3. A compound of the following formula:

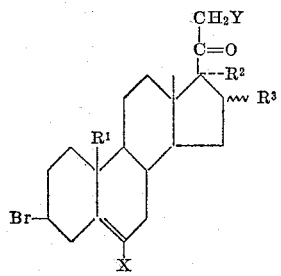

wherein Y is selected from the group consisting of hydrogen and fluorine; X is a member of the group consisting of hydorgen, fluorine, chlorine and methyl; $R^1$ is a member of the group consisting of hydrogen and methyl; $R^2$ is selected from the group consisting of hydroxyl and a hydrocarbon carboxylic acyloxy group of less than 12 carbon atoms; $R^3$ is a member of the group consisting of hydrogen, α-methyl, β-methyl, α-hydroxyl and an α-acyloxy group derived from a hydrocarbon carboxylic acid of less than 12 carbon atoms: $R^2$ and $R^3$ together are in addition, the group

wherein P is a lower alkyl and Q is selected from the group consisting of a lower alkyl, an aryl and an aralkyl group, each containing up to 8 carbon atoms.

4. A compound of the following formula:

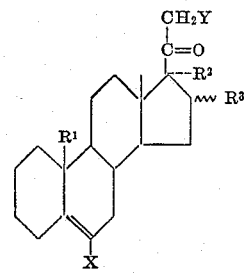

wherein Y is selected from the group consistign of hydrogen and fluorine, X is a member of the group consisting of hydrogen, fluorine, chlorine and methyl; $R^1$ is a member of the group consisting of hydrogen and methyl; $R^2$ is selected from the group consisting of hydroxyl and a hydrocarbon carboxylic acyloxy group of less than 12 carbon atoms; $R^3$ is a member of the group consisting of hydrogen, α-methyl, β-methyl, α-hydroxyl and an α-acyloxy group derived from a hydrocarbon carboxylic acid of less than 12 carbon atoms, $R^2$ and $R^3$ together are in addition, the group

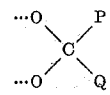

wherein P is a lower alkyl and Q is selected from the group consisting of a lower alkyl, an aryl and an aralkyl group, each containing up to 8 carbon atoms.

5. 3β - chloro - 6 - fluoro-Δ⁵-pregnen-16α,17α-diol-20-one-16,17-acetophenonide.

6. 3β - bromo - 6 - fluoro-17α-acetoxy-16α-methyl-Δ⁵-pregnen-20-one.

7. 3β,6 - difluoro - 17α-acetoxy-16α-methyl-Δ⁵-pregnen-20-one.

8. 3β,6 - difluoro - 17α-acetoxy-16β-methyl-Δ⁵-pregnen-20-one.

9. 3β,6-difluoro-17α-acetoxy-Δ⁵-pregnen-20-one.

10. 3β,6-difluoro-19-nor-Δ⁵-pregnen-20-one.

11. 3β,6 - difluoro - Δ⁵ - pregnen-16α,17α-diol-20-one-16,17-acetophenonide.

12. 3β,6,21-trifluoro-Δ⁵-pregnen-20-one.

13. 6 - fluoro - 17α - acetoxy-16α-methyl-Δ⁵-pregnen-20-one.

14. 6,21 - difluoro - 17α - acetoxy - 16α - methyl - Δ⁵-pregnen-20-one.

15. 6,21 - difluoro - Δ⁵ - pregnen-16α,17α-diol-20-one-16,17-acetophenonide.

16. 3β,6 - dichloro - Δ⁵-pregnen-16α,17α-diol-20-one-16,17-acetophenonide.

17. A process for the production of 3β-chloro-Δ⁵-pregnene derivatives, which comprises treating the corresponding Δ⁵-pregnen-3β-ol with phosphorus pentachloride in an inert solvent.

18. A process for the production of 3β-bromo-Δ⁵-pregnene derivatives, which comprises treating the corresponding Δ⁵-pregnen-3β-ol with phosphorus pentabromide in an inert solvent.

19. A process for the production of 3β-fluoro-Δ⁵-pregnene derivatives, which comprises treating the corresponding Δ⁵-pregnen-3β-ol with p-toluenesulfonic acid in a suitable tertiary amine solvent, treating the resulting 3β-tosylate with a mild base and subsequently reacting the resultant 3,5-cyclopregnane-6β-ol with hydrogen fluoride in an inert solvent.

20. A process for the production of 3-unsubstituted Δ⁵-pregnene derivatives which comprises treating a compound selected from the group consisting of the corresponding 3-chloro-Δ⁵-pregnene and 3-bromoΔ⁵-pregnene with an alkali metal in liquid ammonia.

No references cited.

UNITED STATES PATENT OFFICE
CERTIFICATE OF CORRECTION

Patent No. 3,071,581

January 1, 1963

John A. Zderic et al.

It is hereby certified that error appears in the above numbered patent requiring correction and that the said Letters Patent should read as corrected below.

Column 18, lines 6 to 19, the formula should appear as shown below instead of as in the patent:

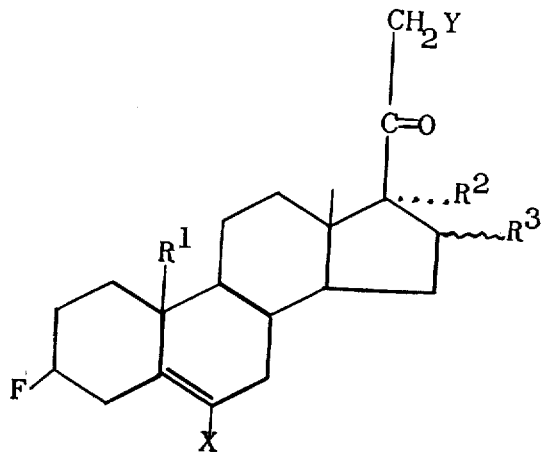

Signed and sealed this 18th day of June 1963.

(SEAL)
Attest:
ERNEST W. SWIDER
Attesting Officer

DAVID L. LADD
Commissioner of Patents